US012790491B2

(12) United States Patent
Yoshida et al.

(10) Patent No.: US 12,790,491 B2
(45) Date of Patent: Nov. 10, 2026

(54) PIGMENT COMPOSITION AND INK USING THE SAME

(71) Applicant: DIC Corporation, Tokyo (JP)

(72) Inventors: Takuya Yoshida, Kamisu (JP); Arata Kudo, Kamisu (JP); Yukiko Higuchi, Kamisu (JP); Akira Kimura, Kamisu (JP)

(73) Assignee: DIC CORPORATION, Tokyo (JP)

(*) Notice: Subject to any disclaimer, the term of this patent is extended or adjusted under 35 U.S.C. 154(b) by 336 days.

(21) Appl. No.: 18/279,441

(22) PCT Filed: Mar. 10, 2022

(86) PCT No.: PCT/JP2022/010458
§ 371 (c)(1),
(2) Date: Aug. 30, 2023

(87) PCT Pub. No.: WO2022/209690
PCT Pub. Date: Oct. 6, 2022

(65) Prior Publication Data

US 2024/0132724 A1 Apr. 25, 2024
US 2024/0228786 A9 Jul. 11, 2024

(30) Foreign Application Priority Data

Apr. 1, 2021 (JP) ................................. 2021-062732

(51) Int. Cl.
*C09B 63/00* (2006.01)
*C09D 11/023* (2014.01)
*C09D 11/037* (2014.01)

(52) U.S. Cl.
CPC .......... *C09B 63/005* (2013.01); *C09D 11/023* (2013.01); *C09D 11/037* (2013.01)

(58) Field of Classification Search
CPC .... C09D 11/023; C09D 11/037; C09B 63/005
See application file for complete search history.

(56) References Cited

U.S. PATENT DOCUMENTS 6,402,828 B1 * 6/2002 Chisholm ........... C09B 67/0046 106/494
2004/0025748 A1 2/2004 Kitamura et al.
2006/0055755 A1 * 3/2006 Yui .......................... B41M 7/00 347/101
2007/0188571 A1 * 8/2007 Tokita .................. B41M 5/0017 347/100
2008/0302271 A1 12/2008 Carlini et al.
2009/0246674 A1 * 10/2009 Carlini ................. G03G 9/0926 430/110.2
2017/0357168 A1 12/2017 Kanno et al.
2019/0315992 A1 * 10/2019 Rahimi .................. C09D 11/40
2020/0199388 A1 * 6/2020 Kyriacou ............... C09D 11/03
2021/0189166 A1 * 6/2021 Suilen .................... C09D 11/38

FOREIGN PATENT DOCUMENTS

| | | | | | |
|---|---|---|---|---|---|
| EP | 2196504 | A2 | | 6/2010 | |
| JP | S52-152306 | A | | 12/1977 | |
| JP | 63-51463 | A | | 3/1988 | |
| JP | 01-104663 | | * | 4/1989 | ............. C09B 67/20 |
| JP | 1-104663 | A | | 4/1989 | |
| JP | 01-266168 | | * | 10/1989 | ............. C09B 67/20 |
| JP | 1-266168 | A | | 10/1989 | |
| JP | 3-157457 | A | | 7/1991 | |
| JP | 5-43829 | A | | 2/1993 | |
| JP | 6-1851 | A | | 1/1994 | |
| JP | 6-1852 | A | | 1/1994 | |
| JP | 2004-67893 | A | | 3/2004 | |
| JP | 2017-223931 | A | | 12/2017 | |
| WO | WO-2011/021591 | A1 | * | 2/2011 | ........... C09D 11/322 |

OTHER PUBLICATIONS

International Search Report dated May 24, 2022, issued in counterpart International Application No. PCT/ JP2022/010458 (3 pages).
Office Action dated Sep. 3, 2024, issued in counterpart JP Application No. 2023-510785 with English translation. (6 pages).

* cited by examiner

*Primary Examiner* — Pegah Parvini
(74) *Attorney, Agent, or Firm* — WHDA, LLP

(57) ABSTRACT

An object of the present invention is to provide a pigment composition and an ink (in particular, a waterborne ink) that can reduce a viscosity increase over time when an azo lake pigment is used as a pigment and also have excellent color strength and gloss in printed products. The pigment composition according to the present invention includes a divalent metal lake azo pigment, and 0.1% by weight to 20% by weight of a divalent metal salt of a mono- or di-carboxylic acid compound. The divalent metal of the divalent metal salt is preferably an alkaline earth metal ion. The mono- or di-carboxylic acid compound is preferably a mono- or di-carboxylic acid compound having a carbon number of 4 to 20.

6 Claims, No Drawings

PIGMENT COMPOSITION AND INK USING THE SAME

TECHNICAL FIELD

The present invention relates to a pigment composition and an ink (in particular, a waterborne ink) using the same.

BACKGROUND ART

From long ago, pigment compositions including pigments such as azo pigments have mainly been used for inks, paints, toners, coloration of rubbers and plastics, dope dyeing of synthetic fibers, pigment printing, and coloration of general goods. Of these applications, printing applications such as inks are important. Printing is performed by preparing a printing plate, applying a printing ink to the printing surface of the printing plate, and transferring the printing ink to paper, films, cloths, and the like. Examples of the printing plate include planographic plates, intaglio plates, letterpress plates, and stencil plates. Depending on the shapes of the plates, the methods of printing such as offset printing, gravure printing, and flexographic printing are exemplified. Of these printing methods, the flexographic printing is a letterpress printing method using a plate made of elastic materials such as rubbers and resins and has features in which this method can be flexibly applied to paper having poor smoothness such as thick paper and cardboards, plastic films, and clothes, due to elasticity of the plate. In recent years, the flexographic printing has attracted attention because high speed printing is possible and environment-conscious waterborne inks can be used.

For flexographic inks used for the flexographic printing, properties of having a low viscosity and not increasing the viscosity over time are required. Generally, Carmine 6B pigment is used as the vermilion pigment of waterborne flexographic inks from the viewpoint of a hue and a cost. However, a problem of increasing the viscosity of the ink over time arises when such a pigment alone is used. Therefore, improvement in viscosity stability has been required. Until now, surface treatment with resin, metal salts, and the like, formation of lake pigment with dissimilar metals, and use of extender pigments and other additives have been studied for the viscosity stabilization (refer to the following PTLs 1 to 5). However, the effect of viscosity stabilization may be insufficient even when any methods are applied.

CITATION LIST

Patent Literature

PTL 1: Japanese Unexamined Patent Application Publication No. H3-157457

PTL 2: Japanese Unexamined Patent Application Publication No. H5-43829

PTL 3: Japanese Unexamined Patent Application Publication No. H6-1851

PTL 4: Japanese Unexamined Patent Application Publication No. H6-1852

PTL 5: Japanese Unexamined Patent Application Publication No. 2004-67893

SUMMARY OF INVENTION

Technical Problem

An object of the present invention is to provide a pigment composition and an ink (in particular, a waterborne ink) that can reduce viscosity increase over time when an azo lake pigment is used as a pigment and have excellent color strength and gloss in printed products.

Solution to Problem

The inventors of the present invention have studied in detail the mechanism of viscosity increase occurring in an ink (in particular, a waterborne ink) using an azo lake ink as a pigment. As a result, the inventors of the present invention have assumed that the viscosity increase in the ink using the azo lake ink occurs due to progress of aggregation of pigment particles with each other by gradually eluting a divalent lake metal such as calcium into the ink system and forming an unstable pigment particle surface from which the lake metal is lost.

As a result of repeated studies, the inventors of the present invention have found that blending a divalent metal salt such as a carboxylic acid compound to the azo lake pigment allows elution of the lake metal form the pigment particle surface to be prevented by supplying the divalent metal ion in the ink system and thus the aggregation of the pigment particles and the viscosity increase in the ink to be reduced. It is assumed that the carboxylic acid compound serving as an anion part in the divalent metal salt reduces aggregation of the pigment particles with each other by coordinating to the pigment particle surface and reduces the viscosity increase in cooperation with the supplied divalent metal ion. In other words, the inventors of the present invention have deemed that with respect to the reduction in the viscosity increase in the ink over time, both of the structure of the anion part (the number of carboxy groups) and the kind of a cation part (the number of the valence of metal ion) are important.

Namely, the present invention relates to:

"Aspect 1: A pigment composition comprising a divalent metal lake azo pigment and 0.1% by weight to 20% by weight of a divalent metal salt of a mono- or di-carboxylic acid compound.

Aspect 2: The pigment composition according to Aspect 1, in which a divalent metal of the divalent metal salt is an alkaline earth metal ion.

Aspect 3. The pigment composition according to Aspect 1 or 2, in which the mono- or di-carboxylic acid compound is a mono- or di-carboxylic acid compound having a carbon number of 4 to 20.

Aspect 4: The pigment composition according to any one of Aspects 1 to 3, in which the mono- or di-carboxylic acid compound is at least one or more compounds selected from the group consisting of tartaric acid, hexanoic acid, sorbic acid, octanoic acid, stearic acid, and dodecanedioic acid.

Aspect 5: The pigment composition according to any one of Aspects 1 to 4, in which the divalent metal lake azo pigment is C.I. Pigment Red 57:1 or C.I. Pigment Red 57:3.

Aspect 6. An ink comprising the pigment composition according to any one of Aspects 1 to 5.

Aspect 7: A waterborne ink formed by mixing the pigment composition according to any one of Aspects 1 to 5 and a water-borne resin."

Advantageous Effects of Invention

The pigment composition according to the present invention can reduce the viscosity increase over time and has excellent color strength and gloss in printed products. Therefore, the pigment composition according to the present invention is suitable for inks (in particular, the waterborne inks).

DESCRIPTION OF EMBODIMENTS

Hereinafter, the present invention will be described in detail below.

[Pigment Composition]

The pigment composition according to the present invention includes a divalent metal lake azo pigment and 0.1% by weight to 20% by weight of a divalent metal salt of a mono- or di-carboxylic acid compound. Hereinafter, the divalent metal salt of the mono- or di-carboxylic acid compound may be simply referred to as an "additive".

(Divalent Metal Lake Azo Pigment)

The divalent metal lake azo pigment refers to an azo pigment having an azo group (—N═N—) in the molecule laked with at least one kind or more kinds of divalent metals such as calcium, barium, strontium, and manganese. Examples of the divalent metal azo lake pigment include C.I. Pigment Red 57:1, C.I. Pigment Red 57:3, C.I. Pigment Red 48:1, C.I. Pigment Red 48:2, C.I. Pigment Red 48:3, C.I. Pigment Red 48:4, C.I. Pigment Red 49:1, C.I. Pigment Red 49:2, C.I. Pigment Red 49:3, C.I. Pigment Red 52:1, C.I. Pigment Red 53:1, C.I. Pigment Red 60:1, C.I. Pigment Red 64:1, C.I. Pigment Red 51, C.I. Pigment Red 58:2, C.I. Pigment Red 50:1, C.I. Pigment Red 63:1, C.I. Pigment Red 63:2, C.I. Pigment Red 63:3, and C.I. Pigment Red 54 and C.I. Pigment Orange 17, C.I. Pigment Orange 18, and C.I. Pigment Orange 19. Of these pigments, C.I. Pigment Red 57:1 and C.I. Pigment Red 57:3 are preferable as the divalent metal lake azo pigment. The divalent metal lake azo pigment may be used singly or in combination of two or more of the pigments.

A primary particle diameter of the divalent metal lake azo pigment is, for example, 0.01 μm to 1.0 μm and preferably 0.1 μm to 0.6 μm. The specific surface area of the divalent metal lake azo pigment is, for example, 10 $m^2/g$ to 150 $m^2/g$ and preferably 20 $m^2/g$ to 100 $m^2/g$. The divalent metal lake azo pigment having the primary particle and the specific surface area within the above ranges provides excellent color strength and dispersibility.

(Additive)

Examples of the mono-carboxylic acid compound in the additive include saturated fatty acids such as propanoic acid, butanoic acid, pentanoic acid, hexanoic acid, heptanoic acid, octanoic acid, nonanoic acid, decanoic acid, dodecanoic acid, tetradecanoic acid, hexadecanoic acid, and heptadecanoic acid; unsaturated fatty acids such as sorbic acid, oleic acid, linoleic acid, linolenic acid, and arachidonic acid; and aromatic carboxylic acids such as benzoic acid and salicylic acid. Examples of the di-carboxylic acid compound include saturated fatty acids such as ethanedioic acid, propanedioic acid, butanedioic acid, pentanedioic acid, hexanedioic acid, and dodecanedioic acid; unsaturated fatty acids such as fumaric acid and maleic acid; hydroxy acids such as tartaric acid and malic acid; and aromatic carboxylic acids such as phthalic acid, isophthalic acid, and terephthalic acid. These mono- or di-carboxylic acid compounds preferably have a carbon number of 4 to 20. As these mono- or di-carboxylic acid compounds, tartaric acid, hexanoic acid, sorbic acid, octanoic acid, stearic acid, and dodecanedioic acid are particularly preferable.

Examples of the divalent metal salt in the additive include salts of calcium, magnesium, barium, strontium, manganese, zinc, cobalt, chromium, iron, and copper. Of these di-valent metal salts, alkali earth metals (ions) such as calcium, barium, and strontium are particularly preferable.

Therefore, calcium tartrate, strontium tartrate, barium tartrate, calcium hexanoate, calcium sorbate, calcium stearate, and calcium dodecanedicate are particularly preferable as the additive. The additive may be used singly or in combination of two or more of the additives.

The content of the additive is 0.1% by weight to 20% by weight, preferably 0.2% by weight to 15% by weight, and more preferably 0.3% by weight to 10% by weight relative to 100% by weight of the pigment composition. In addition, the content of the additive is, for example, 0.05 part by weight to 20 parts by weight, preferably 0.1 part by weight to 18 parts by weight, and more preferably 0.3 part by weight to 15 parts by weight relative to 100 parts by weight of the divalent metal lake azo pigment. As the blended amount of the additive becomes larger, the reduction effect of the viscosity increase becomes higher. However, an excessive blended amount leads to deterioration in the color strength and gloss of the ink. Therefore, setting the blended amount within the above range is preferable from the viewpoint of the balance between the reduction effect of the viscosity increase and the color strength and gloss.

In addition to the divalent metal lake azo pigment, the pigment composition according to the present invention may include organic pigments (dyes) generally used as coloring agents in the applications such as inks. Examples of such organic pigments (dyes) include insoluble azo, condensed azo, quinophthalone, isoindolinone, isoindoline, azomethine, anthraquinone, xanthene, diketopyrrolopyrrole, perylene, perinone, quinacridone, indigoid, dioxazine, and phthalocyanine. The pigment composition according to the present invention includes the divalent metal lake azo pigment and thus a red or yellow organic pigment (dye) is preferably included for the purpose of toning.

The pigment composition according to the present invention may include components excluding the divalent metal lake azo pigment, the additive, the organic pigment (dye) other than the divalent metal lake azo pigment (hereinafter, may be referred to as "other components") as long as the other components do not impair the effect of the present invention. Examples of the other components include pigment derivatives, inorganic pigments, dispersants (surfactants), and rosin.

Examples of the pigment derivatives include sulfonic acid pigment derivatives, amino group-containing pigment derivatives, and phthalimidomethyl group-containing pigment derivatives. Examples of the inorganic pigments include calcium carbonate, magnesium carbonate, precipitated barium sulfate, kaolin, clay, alumina white, and white carbon. Examples of the dispersing agents (surfactants) include anionic compounds, cationic compounds, nonionic compounds, and polymer compounds.

In the case where the pigment composition includes the other components, the content of the other components is, for example, 0.1% by weight to 10% by weight and preferably 0.2% by weight to 5% by weight relative to 100% by weight of the pigment composition. Therefore, in the case where the pigment composition includes the other components, the content of the total of the divalent metal lake azo pigment and the additive in the pigment composition according to the present invention is, for example, 90% by weight to 99.9% by weight and preferably 95% by weight to 99.8% by weight relative to 100% by weight of the pigment composition.

[Method for Producing Pigment Composition]

One example of the method for producing the pigment composition according to the present invention will be described below. The pigment composition according to the present invention is obtained through, for example, 1) Synthesis of divalent metal lake azo pigment and 2) Addition of divalent metal salt of mono- or di-carboxylic acid.

First, in 1), coupling of a diazo component composed of an aromatic amine diazonium salt and a coupler component composed of an aromatic compound other than an aromatic amine constituting the diazonium salt is performed to synthesize an azo pigment. The aromatic amine diazonium salt serving as the diazo component is obtained by acidifying the aromatic amine with hydrochloric acid and adding an aqueous sodium nitrite solution. The coupling of the diazo component and the coupler component is performed under alkaline conditions using sodium hydroxide or the like. A soluble azo (dye) obtained after the coupling was made to be insoluble by adding the divalent metal salts of calcium, barium, strontium, or the like to give a divalent metal lake azo pigment. Filtration, washing, and the like may be performed for the obtained pigment, if necessary. In 1) Synthesis of divalent metal lake azo pigment, the synthesis by the coupling reaction as described above is not performed, but a commercially available divalent metal lake azo pigment may be used as it is.

Subsequently, in 2), a divalent metal salt of the mono- or di-carboxylic acid compound is added to the divalent metal lake azo pigment obtained in 1). The blended amount of this additive is 0.1% by weight to 20% by weight, preferably 0.2% by weight to 15% by weight, and more preferably 0.3% by weight to 10% by weight relative to 100% by weight of the pigment composition. At the time of the addition, stirring may be performed so as to be uniform.

The pigment composition obtained through 1) and 2) may be further subjected to common pigment formation treatment such as particle size adjustment, pH adjustment, filtration, washing with alcohol, washing with water, drying, and grinding, if necessary. The particle diameter may be adjusted by aging the azo pigment in water and/or an organic solvent under normal pressure or increased pressure with heating and stirring or may be adjusted by known methods such as an acid paste method, an acid slurry method, a dry milling method, a solvent method, and a solvent milling method. The surface of the pigment particles may be treated with pigment derivatives such as sulfonic acid pigment derivatives, amino group-containing pigment derivatives, phthalimidomethyl group-containing pigment derivatives, polymers such as dispersing agents, surfactants, and rosin.

[Ink]

The ink according to the present invention includes the pigment composition according to the present invention. The ink according to the present invention can be used for various applications such as offset printing, gravure printing, flexographic printing, screen printing, and printing using an inkjet method. In other words, the ink according to the present invention can be used as, for example, offset inks, gravure inks, flexographic inks, screen inks, and inkjet inks. The ink according to the present invention includes components suitable for each ink, as described later, in addition to the pigment composition according to the present invention.

The offset ink refers to an ink used in planographic printing (planographic printing using dampening water and waterless planographic printing not using dampening water), letterpress printing, intaglio printing, stencil printing, and various printing methods combining a transfer (offset) method in which the inks applied to these printing plates are transferred to a transfer intermediate such as a blanket and thereafter printing to products to be printed.

A planographic offset ink includes components such as resin varnish, organic solvents, oils such as animal and vegetable oils, and auxiliary agents (for example, drying inhibitors, dryers, abrasion resistance improvers, and the like) in addition to the azo pigment according to the present invention. The planographic offset ink is produced by appropriately mixing these components and kneading and dispersing the components in a roll mill or the like. Inks applicable for the planographic offset printing method are inks usually having a relatively high viscosity of 5 Pa·s to 100 Pa·s.

Examples of the resin used in the resin varnish include rosin-modified phenolic resins, petroleum resins, petroleum resin-modified rosin-modified phenolic resins, alkyd resins, rosin esters, vegetable oil-modified rosin-modified phenolic resins, vegetable oil-modified rosin esters, polyesters, and acrylic resins. Examples of the organic solvents include solvents commonly used for inks such as hydrocarbon-based solvents, alcohol-based solvents, ester-based solvents, and ketone-based solvents.

Liquid inks used as a gravure ink or a flexographic ink can be broadly classified into organic solvent-type liquid inks, which use an organic solvent as the main solvent and waterborne liquid inks, which use water as the main solvent. The ink according to the present invention can be applied to both organic solvent-type liquid ink and waterborne liquid ink.

The liquid inks include binder resins, solvents, and dispersing agents in addition to the pigment composition according to the present invention. In the case where the main component of the solvent is classified as an organic solvent, the ink is the organic solvent-type liquid ink, whereas when the main component of the solvent is a waterborne solvent such as a water-miscible organic solvent or water, the ink is classified as the waterborne liquid ink.

The liquid ink is obtained by dispersing a mixture into which the pigment and the binder resin are added using a dispersing machine to give a pigment dispersion, adding resins, solvents, and if necessary, additives such as leveling agents to the obtained pigment dispersion, and stirring and mixing. The ink viscosity of the liquid ink is preferably in the range of 10 mPa·s or more from the viewpoint of preventing pigment sedimentation and providing adequate dispersion and 1,000 mPa·s or less from the viewpoint of workability efficiency at the time of ink production and printing.

The binder resin is not particularly limited. As the binder resin, for example, polyurethane-based resins, acrylic resins, vinyl chloride-vinyl acetate copolymer resins, vinyl chloride-acrylic copolymer resins, chlorinated polyolefin resins, modified polyolefin resins, cellulose, cellulose derivatives, polyamide resins, ethylene-vinyl acetate copolymer resins, vinyl acetate resins, styrene resins, dammar resins, styrene-maleic acid copolymer resins, polyester resins, alkyd resins, polyvinyl chloride resins, rosin-based resins, rosin modified maleic acid resins, terpene resins, phenol-modified terpene resins, ketone resins, cyclized rubbers, chlorinated rubbers, butyral resins, polyacetal resins, petroleum resins, which are used for a common liquid ink, and modified resins thereof can be used.

Examples of the organic solvent include aromatic hydrocarbon-based organic solvents such as toluene, xylene, Solvesso #100, and Solvesso #150; aliphatic hydrocarbon-based organic solvents such as hexane, methylcyclohexane, heptane, octane, and decane; and ester-based organic solvents such as methyl acetate, ethyl acetate, isopropyl acetate, normal propyl acetate, butyl acetate, amyl acetate, ethyl formate, and butyl propionate. Examples of the water-miscible organic solvents include alcohol-based solvents such as methanol, ethanol, propanol, butanol, and isopropyl alcohol; ketone-based solvents such as acetone, methyl ethyl ketone, and cyclohexanone; and glycol ether-based solvents such as ethylene glycol (mono, di)methyl ether, ethylene glycol (mono, di)ethyl ether, ethylene glycol monopropyl ether, ethylene glycol monoisopropyl ether, ethylene glycol monobutyl ether, diethylene glycol (mono, di)methyl ether, diethylene glycol (mono, di)ethyl ether, diethylene glycol monoisopropyl ether, diethylene glycol monobutyl ether, triethylene glycol (mono, di)methyl ether, propylene glycol (mono, di)methyl ether, propylene glycol monopropyl ether, propylene glycol monobutyl ether, and dipropylene glycol (mono, di)methyl ether.

The ink according to the present invention uses the pigment composition according to the present invention. In addition to the pigment composition, organic pigments and inorganic pigments used in common inks may be used together as coloring agents as long as these pigments do not affect the effect of the present invention.

Examples of the organic pigments include phthalocyanine-based, halogenated phthalocyanine-based, anthraquinone-based, anthanthrone-based, dianthraquinonyl-based, anthrapyrimidine-based, perylene-based, perinone-based, quinacridone-based, thioindigo-based, dioxazine-based, isoindolinone-based, quinophthalone-based, insoluble azo-based, condensed azo-based, azomethine-based, flavanthrone-based, diketopyrrolopyrrole-based, isoindoline-based, indanthrone-based, and carbon black-based pigments. Examples of the inorganic pigments include white pigments such as titanium dioxide, zinc oxide, zinc sulfide, barium sulfate, calcium carbonate, chromium oxide, silica, lithopone, antimony white, and gypsum.

Examples of the inorganic pigments other than the white pigments include aluminum particles, mica, bronze powder, chrome vermillion, lead yellow, cadmium yellow, cadmium red, ultramarine, Prussian blue, red iron oxide, yellow iron oxide, iron black, and zircon.

The ink according to the present invention may further include various additives such as waxes, chelate-based cross-linking agents, extender pigments, leveling agents, defoaming agents, plasticizers, infrared absorbers, ultraviolet absorbers, aromatic agents, and flame retardants, if necessary.

In the case where the ink according to the present invention is an inkjet ink, in addition to the pigment composition according to the present invention, the inkjet ink may include the organic pigments and inorganic pigments described above, dyes (for example, anionic azo dyes, phthalocyanine, and azo-based metal complex salts), resins (for example, acrylic block copolymers, acrylic resins, maleic acid resins, rosin, epoxy resins, silicone resins, and thermoplastic resins such as butyral resins), solvents (for example, water, ketones, alcohols, and ethyl acetate), penetrating agents (for example, alcohols and glycol ethers), anti-drying agents (for example, glycerin and glycols), pH adjusters (for example, alcoholamines and NaOH), surfactants (for example, nonionic surfactants, cationic surfactants, and anionic surfactants), conductivity imparting agents, plasticizers, antioxidants, UV absorbers, preservatives, and antifungal agents. The inkjet ink may be waterborne inks or oil-based inks. The inkjet ink may be used in either a piezo method or a thermal method.

[Waterborne Ink]

The waterborne ink according to the present invention is one of the preferable aspects in the ink according to the present invention and includes a mixture of the pigment composition according to the present invention and the waterborne resin. Similar to the ink according to the present invention described above, the waterborne ink according to the present invention can also be used for various applications such as printing and is particularly suitable for the flexographic printing. In other words, the waterborne ink according to the present invention is particularly preferably a waterborne flexographic ink. The waterborne ink according to the present invention includes the pigment composition according to the present invention and thus the viscosity increase over time can be reduced and the color strength and gloss in printed products are also excellent.

Generally, waterborne inks include colorants such as the pigment composition according to the present invention, waterborne resins for constituting vehicle (waterborne varnish), auxiliary agents, and solvents. The important role of the vehicle is to disperse the colorants, to impart printability and the physical properties of coating films on the printed products, and finally to transfer and fix the ink serving as the colorant to the products to be printed.

The waterborne resins may be waterborne resins commonly used for printing applications. Examples of the waterborne resins include water-soluble acrylic resins, styrene-acrylic resins, styrene-maleic acid-acrylic acid-based resins, and styrene-maleic acid-based resins. The acrylic resins are, for example, resins containing acid components such as acrylic acid and methacrylic acid or acrylic acid ester resins, methacrylic acid ester resins, or copolymers thereof. The styrene-acrylic resins are, for example, resins containing styrene and acid components such as acrylic acid or methacrylic acid, resins containing styrene and acrylic acid esters or methacrylic acid esters, or copolymers thereof. The styrene-maleic acid-acrylic acid-based resins are, for example, resins containing styrene and acid components such as maleic acid and acrylic acid or methacrylic acid, resins containing styrene and maleic acid or maleic acid half ester and acrylic acid ester or methacrylic acid ester, or copolymers thereof. The styrene-maleic acid-based resins are resins containing styrene and maleic acid, maleic acid half esters, or the like. The above waterborne resins may be either emulsion-type resins or colloidal dispersion-type resins.

The waterborne resins, alkali soluble resins, and water are heated to dissolve the resins into water to form a vehicle (waterborne varnish). The alkali soluble resins are resins in which carboxy groups (—COOH groups), which are functional groups in the resin, are neutralized by an alkali component. Thereafter, the coloring agents such as the pigment composition according to the present invention are dissolved in the vehicle (waterborne varnish), pigment dispersion is performed through kneading and adjustment, and auxiliary agents such as defoaming agents, pigment dispersing agents, and surfactants and solvents such as water, lower alcohols, and glycol-based solvents are added to prepare the waterborne ink. Water solubilizers such as aqueous ammonia and organic amines, auxiliary agents such as alcohols, and emulsifiers may be added, if necessary.

EXAMPLE

Hereinafter, the present invention will be described further in detail with reference to Examples and Comparative Examples. In Examples and Comparative Examples described later, "part" and "%" represent "part by weight" and "% by weight", respectively, unless otherwise noted.

Pigment Compositions 1 to 15 were produced by methods described in Production Examples 1 to 15 described later and waterborne inks in Examples 1 to 15 were further prepared. In addition, Pigment Compositions 16 to 21 were produced by methods described in Production Examples 16 to 21 described later and waterborne inks in Comparative Examples 1 to 6 were further prepared. With respect to the thus obtained waterborne inks, viscosity, color strength, and gloss were evaluated in accordance with the following methods. The evaluation results of the waterborne inks are listed in Table 1 later.

Example 1: Pigment Composition 1

After dispersing 50 parts of 4-aminotoluene-3-sulfonic acid and 2.6 parts of 2-aminonaphthalene-1-sulfonic acid in 170 parts of water, 32 parts of 35% hydrochloric acid was added and 49 parts of 40% aqueous sodium nitrite solution was added dropwise while the temperature was maintained at 5° C. or less to give a diazonium salt suspension liquid. Subsequently, 54 parts of 2-hydroxy-3-naphthoic acid was dispersed in 521 parts of water, and thereafter 111 parts of 25% aqueous caustic soda solution was added to dissolve. The resultant solution was cooled to 5° C. or less. The diazo liquid was added dropwise to this coupler solution with stirring to perform coupling reaction. After the reaction was completed, 116 parts of aqueous 10% rosin soda solution was added and the mixture was stirred for 20 minutes. Added was 113 parts of a 35% aqueous calcium chloride solution, and the resultant mixture was stirred for 90 minutes. After the stirring, 135 parts of 23% aqueous strontium chloride solution was added and stirred for 60 minutes. The temperature was raised to 80° C. and the resultant mixture was stirred for another 60 minutes to give a suspension liquid in water of an azo pigment (C.I. Pigment Red 57:3) laked with Ca and Sr. The suspension liquid was filtered, washed with water, and dried at 110° C. overnight. Thereafter, the dried product was crushed to give 137 parts of an azo pigment powder. The obtained azo pigment powder was blended with 0.14 parts of calcium tartrate tetrahydrate serving as an additive (blending ratio 0.1%) to give red Pigment Composition 1.

Production Example 2: Pigment Composition 2

Pigment Composition 2 was obtained by performing the same operation except that 0.14 parts of calcium tartrate tetrahydrate in Production Example 1 was changed to 0.41 parts of calcium tartrate tetrahydrate (blending ratio: 0.3%).

Production Example 3: Pigment Composition 3

Pigment Composition 3 was obtained by performing the same operation except that 0.14 parts of calcium tartrate tetrahydrate in Production Example 1 was changed to 0.69 parts of calcium tartrate tetrahydrate (blending ratio: 0.5%).

Production Example 4: Pigment Composition 4

Pigment Composition 4 was obtained by performing the same operation except that 0.14 parts of calcium tartrate tetrahydrate in Production Example 1 was changed to 1.37 parts of calcium tartrate tetrahydrate (blending ratio: 1.0%).

Production Example 5: Pigment Composition 5

Pigment Composition 5 was obtained by performing the same operation except that 0.14 parts of calcium tartrate tetrahydrate in Production Example 1 was changed to 2.74 parts of calcium tartrate tetrahydrate (blending ratio: 2.0%).

Production Example 6: Pigment Composition 6

Pigment Composition 6 was obtained by performing the same operation except that 0.14 parts of calcium tartrate tetrahydrate in Production Example 1 was changed to 4.11 parts of calcium tartrate tetrahydrate (blending ratio: 3.0%).

Production Example 7: Pigment Composition 7

Pigment Composition 7 was obtained by performing the same operation except that 0.14 parts of calcium tartrate tetrahydrate in Production Example 1 was changed to 13.71 parts of calcium tartrate tetrahydrate (blending ratio: 10.0%).

Production Example 8: Pigment Composition 8

Pigment Composition 8 was obtained by performing the same operation except that 0.14 parts of calcium tartrate tetrahydrate in Production Example 1 was changed to 27.43 parts of calcium tartrate tetrahydrate (blending ratio: 20.0%).

Production Example 9: Pigment Composition 9

Pigment Composition 9 was obtained by performing the same operation except that 0.14 parts of calcium tartrate tetrahydrate in Production Example 1 was changed to 2.74 parts of strontium tartrate (blending ratio: 2.0%).

Production Example 10: Pigment Composition 10

Pigment Composition 10 was obtained by performing the same operation except that 0.14 parts of calcium tartrate tetrahydrate in Production Example 1 was changed to 2.74 parts of barium tartrate (blending ratio: 2.0%).

Production Example 11: Pigment Composition 11

Pigment Composition 11 was obtained by performing the same operation except that 0.14 parts of calcium tartrate tetrahydrate in Production Example 1 was changed to 2.74 parts of calcium hexanoate (blending ratio: 2.0%).

Production Example 12: Pigment Composition 12

Pigment Composition 12 was obtained by performing the same operation except that 0.14 parts of calcium tartrate tetrahydrate in Production Example 1 was changed to 2.74 parts of calcium sorbate (blending ratio: 2.0%).

Production Example 13: Pigment Composition 13

Pigment Composition 13 was obtained by performing the same operation except that 0.14 parts of calcium tartrate tetrahydrate in Production Example 1 was changed to 2.74 parts of calcium octanoate (blending ratio: 2.0%).

Production Example 14: Pigment Composition 14

Pigment Composition 14 was obtained by performing the same operation except that 0.14 parts of calcium tartrate tetrahydrate in Production Example 1 was changed to 2.74 parts of calcium stearate (blending ratio: 2.0%).

Production Example 15: Pigment Composition 15

Pigment Composition 15 was obtained by performing the same operation except that 0.14 parts of calcium tartrate tetrahydrate in Production Example 1 were changed to 2.74 parts of calcium dodecanedioic acid (blending ratio: 2.0%).

Examples 1 to 15: Waterborne Inks

Placed in a glass container were 34.75 parts of each of Pigment Compositions 1 to 15 obtained above, 56.00 parts of waterborne varnish, 0.46 parts of an activator, and 150 parts of glass beads (2 mm in diameter), and the resultant mixture was dispersed in a dispersion machine for 60 minutes to give waterborne inks. These waterborne inks were designated as Examples 1 to 15, respectively.

Production Example 16: Pigment Composition 16

Pigment Composition 16 was prepared without blending 0.14 parts of calcium tartrate tetrahydrate in Production Example 1.

Production Example 17: Pigment Composition 17

Pigment Composition 17 was obtained by performing the same operation except that 0.14 parts of calcium tartrate tetrahydrate in Production Example 1 was changed to 2.74 parts of tartaric acid (blending ratio: 2.0%).

Production Example 18: Pigment Composition 18

Pigment Composition 18 was obtained by performing the same operation except that 0.14 parts of calcium tartrate tetrahydrate in Production Example 1 was changed to 41.14 parts of calcium tartrate tetrahydrate (blending ratio: 30.0%).

Production Example 19: Pigment Composition 19

Pigment Composition 19 was obtained by performing the same operation except that 0.14 parts of calcium tartrate tetrahydrate in Production Example 1 was changed to 2.74 parts of sodium tartrate dihydrate (blending ratio: 2.0%).

Production Example 20: Pigment Composition 20

Pigment Composition 20 was obtained by performing the same operation except that 0.14 parts of calcium tartrate tetrahydrate in Production Example 1 was changed to 2.74 parts of potassium tartrate 0.5 hydrate (blending ratio: 2.0%).

Production Example 21: Pigment Composition 21

Pigment Composition 21 was obtained by performing the same operation except that 0.14 parts of calcium tartrate tetrahydrate in Production Example 1 was changed to 2.74 parts of calcium citrate tetrahydrate (blending ratio: 2.0%).

Comparative Examples 1 to 6: Waterborne Inks

Placed in a glass container were 34.75 parts of Pigment Compositions 16 to 21 obtained above, 56.00 parts of waterborne varnish, 0.46 parts of an activator, and 150 parts of glass beads (2 mm in diameter), and the resultant mixture was dispersed in a dispersion machine for 60 minutes to give waterborne inks. These waterborne inks were designated as Comparative Examples 1 to 6, respectively.

<Evaluation: Viscosity Test>

After weighing 30 parts of the waterborne ink immediately after preparation and cooling the weighed waterborne ink to 20° C., a viscosity was measured using a B-type viscometer. This viscosity was determined to be an initial viscosity. Subsequently, this waterborne ink was stored at 50° C. for 7 days, and thereafter a viscosity was measured in the same manner. This viscosity was determined to be a viscosity over time. For both of the initial viscosity and the viscosity over time, relative values were recorded when the initial viscosity of Comparative Example 1 serving as the reference was determined to be 100%.

<Evaluation: Color Strength>

Two parts of the waterborne ink immediately after preparation and 24 parts of a titanium oxide pigment ink were mixed to give a light-colored ink. The obtained light-colored ink was spread on a sheet of test paper and the color strength of the spread product was measured using Datacolor 650 manufactured by Datacolor. The color strength is represented as a relative value when the color strength of Comparative Example 1 serving as the reference was determined to be 100%.

<Evaluation: Gloss Value>

Ten parts of the waterborne ink immediately after preparation and 22.5 parts of waterborne varnish for dilution were mixed to give a diluted ink. The obtained diluted ink was spread on a test film and the gloss value of the spread product was measured using MULTI GLOSS 268 Plus manufactured by KONICA MINOLTA, INC. The gloss value is represented as a relative value when the gloss value of Comparative Example 1 serving as the reference is determined to be 100%.

TABLE 1

| | Additive* | Mixing ratio of additive | Initial viscosity | Viscosity over time | Color strength | Gloss value (60°) |
|---|---|---|---|---|---|---|
| Example 1 | Calcium tartrate | 0.1% | 100% | 252% | 100% | 101% |
| Example 2 | Calcium tartrate | 0.3% | 96% | 185% | 100% | 102% |
| Example 3 | Calcium tartrate | 0.5% | 96% | 140% | 100% | 99% |
| Example 4 | Calcium tartrate | 1.0% | 90% | 123% | 99% | 99% |
| Example 5 | Calcium tartrate | 2.0% | 86% | 124% | 99% | 99% |
| Example 6 | Calcium tartrate | 3.0% | 91% | 117% | 98% | 97% |
| Example 7 | Calcium tartrate | 10.0% | 89% | 61% | 91% | 94% |
| Example 8 | Calcium tartrate | 20.0% | 70% | 37% | 87% | 88% |
| Example 9 | Strontium tartrate | 2.0% | 82% | 120% | 97% | 101% |
| Example 10 | Barium tartrate | 2.0% | 82% | 114% | 97% | 101% |
| Example 11 | Calcium hexanoate | 2.0% | 97% | 140% | 99% | 96% |

TABLE 1-continued

| | Additive* | Mixing ratio of additive | Initial viscosity | Viscosity over time | Color strength | Gloss value (60°) |
|---|---|---|---|---|---|---|
| Example 12 | Calcium sorbate | 2.0% | 106% | 154% | 98% | 96% |
| Example 13 | Calcium octanoate | 2.0% | 84% | 154% | 100% | 98% |
| Example 14 | Calcium stearate | 2.0% | 91% | 237% | 102% | 101% |
| Example 15 | Calcium dodecanedicate | 2.0% | 91% | 217% | 100% | 99% |
| Comparative Example 1 | Not added | — | 100% | 298% | 100% | 100% |
| Comparative Example 2 | Tartaric acid | 2.0% | 124% | 238% | 100% | 93% |
| Comparative Example 3 | Calcium tartrate | 30.0% | 57% | 30% | 80% | 83% |
| Comparative Example 4 | Sodium tartrate | 2.0% | 70% | 1443% | 100% | 106% |
| Comparative Example 5 | Potassium tartrate | 2.0% | 79% | 1385% | 100% | 106% |
| Comparative Example 6 | Calcium citrate | 2.0% | 74% | 788% | 99% | 100% |

*Notations for hydration water in additive are omitted.

As can be seen from Table 1, it can be found that in Examples 1 to 15, the increase in viscosity over time was capable of being reduced while the color strength and gloss were maintained by blending specific amounts of the additive.

Details of what can be found from the results of Examples are as follows.

As Comparative Example 2, in the case where the carboxylic acid compound without metal ions serving as the counterion was used as the additive, the effect of reduction in the viscosity increase was weak and the gloss of the ink was reduced. The inventors of the present invention consider that this is the result of an increase in the pH of the ink due to the addition of the unneutralized carboxylic acid compound, which adversely affects dispersion. As can be seen from Comparative Examples 4 and 5, in the case where the cationic part of the additive was monovalent metal ions such as sodium, the viscosity increase was rather induced. From this result, it can be said that divalent metal ions are required to prevent aggregation. As can be seen in Comparative Example 6, the viscosity increase was also induced in the case where the carboxylic acid compound having three carboxy groups serving as the anionic part was selected. It is assumed that this viscosity increase was caused by forming complex aggregates having cross-linked structures with the metal ion, the pigment particles, and the resin in the ink system due to the three carboxy groups. The same phenomenon may be presumed to occur in the case where a carboxylic acid compound having four or more carboxy groups is used. Therefore, the additive having two or less carboxy group is desirable as the anionic part. In addition, as can be seen in Comparative Example 3, as the blending amount of the additive in the present invention becomes larger, the effect for reducing the viscosity increase becomes higher. However, an excessive blending amount leads to a decrease in the color strength and gloss of the ink. Therefore, it can be said that the effective blending ratio of the additive is 0.1% by weight to 20.0% by weight (a more effective range is 0.3% by weight to 10.0% by weight).

The invention claimed is:

1. A pigment composition comprising:

a divalent metal lake azo pigment selected from the group consisting of C.I. Pigment Red 57:1, C.I. Pigment Red 57:3, C.I. Pigment Red 48:1, C.I. Pigment Red 48:2, C.I. Pigment Red 48:3, C.I. Pigment Red 48:4, C.I. Pigment Red 49:1, C.I. Pigment Red 49:2, C.I. Pigment Red 49:3, C.I. Pigment Red 52:1, C.I. Pigment Red 53:1, C.I. Pigment Red 60:1, C.I. Pigment Red 64:1, C.I. Pigment Red 51, C.I. Pigment Red 58:2, C.I. Pigment Red 50:1, C.I. Pigment Red 63:1, C.I. Pigment Red 63:2, C.I. Pigment Red 63:3, C.I. Pigment Red 54, C.I. Pigment Orange 17, C.I. Pigment Orange 18, C.I. Pigment Orange 19, and combinations thereof; and 0.1% by weight to 20% by weight of a divalent metal salt of a mono- or di-carboxylic acid compound, wherein the divalent metal salt is selected from the group consisting of calcium tartrate, strontium tartrate, barium tartrate, calcium hexanoate, and combinations thereof, wherein a total content of the divalent metal lake azo pigment and the divalent metal salt in the pigment composition is 90% by weight to 99.9% by weight.

2. The pigment composition according to claim 1, wherein the divalent metal salt is calcium tartrate, strontium tartrate, or barium tartrate.

3. The pigment composition according to claim 1, wherein the divalent metal lake azo pigment is C.I. Pigment Red 57:1 or C.I. Pigment Red 57:3.

4. An ink comprising the pigment composition according to claim 1.

5. A waterborne ink formed by mixing the pigment composition according to claim 1 and a waterborne resin.

6. The pigment composition according to claim 1, wherein the divalent metal lake azo pigment is a combination of C.I. Pigment Red 57:1 and C.I. Pigment Red 57:3.

* * * * *